United States Patent
Jannard

(10) Patent No.: US 8,019,216 B2
(45) Date of Patent: Sep. 13, 2011

(54) FOCUS CALIBRATION APPARATUS FOR CAMERA LENS FINE TUNING

(75) Inventor: James H. Jannard, Las Vegas, NV (US)

(73) Assignee: RED.COM, Inc., Lake Forest, CA (US)

( * ) Notice: Subject to any disclaimer, the term of this patent is extended or adjusted under 35 U.S.C. 154(b) by 0 days.

(21) Appl. No.: 12/625,451

(22) Filed: Nov. 24, 2009

(65) Prior Publication Data

US 2010/0158510 A1    Jun. 24, 2010

Related U.S. Application Data

(60) Provisional application No. 61/117,850, filed on Nov. 25, 2008.

(51) Int. Cl.
*G03B 17/00* (2006.01)
*G02B 7/02* (2006.01)

(52) U.S. Cl. ........................................ 396/533; 359/829

(58) Field of Classification Search .................. 396/533, 396/131, 144; 359/825, 827, 829, 830
See application file for complete search history.

(56) References Cited

U.S. PATENT DOCUMENTS

| | | | | |
|---|---|---|---|---|
| 2,357,327 | A | * | 9/1944 | Harris et al. .................. 396/144 |
| 4,946,255 | A | * | 8/1990 | Mizoguchi et al. ........... 359/823 |
| 7,221,402 | B2 | * | 5/2007 | Cheng .......................... 348/375 |
| 2007/0196094 | A1 | * | 8/2007 | Chiang ........................ 396/144 |

* cited by examiner

*Primary Examiner* — Clayton E Laballe
*Assistant Examiner* — Noam Reisner
(74) *Attorney, Agent, or Firm* — Knobbe Martens Olson & Bear LLP

(57) ABSTRACT

A focus calibration apparatus allows fine adjustments to be made to the focal distance between a camera lens and sensor, in particular to take into account small changes in the mechanical tolerances such as when changing lenses. The calibration apparatus has a simple mechanism, like a focus ring, that a user can easily manipulate to simplify and speed the lens calibration process.

20 Claims, 7 Drawing Sheets

FOCUS CALIBRATION APPARATUS FOR CAMERA LENS FINE TUNING

CROSS-REFERENCE TO RELATED APPLICATIONS

The present application claims priority from U.S. Provisional No. 61/117,850, filed Nov. 25, 2008, which is incorporated by reference herein.

BACKGROUND

The present disclosure relates to focus adjustment for camera lenses.

Generally, cameras accept visual light through a camera lens and capture that light on a recording surface—film, or as is now common, a digital sensor. In order to reproduce an object clearly, the object must be in focus. The focus level of the various objects in a camera viewfinder may be adjusted by changing the size of the camera lens aperture or by varying the distance between the camera lens and the recording surface.

For many premium cameras, such as high-end movie cameras, it is desirable that the focus be as precise as possible. Images from these cameras are often displayed in large formats, in which small errors in focus are readily apparent. In these contexts, even minor factors, like discrepancies in the mechanical tolerances at the lens mount, can throw off the focus of an image.

It is common practice to calibrate a lens's focus when it is first placed onto a camera with thin shims placed in a camera's lens mount at the base of the lens. The camera operator uses these shims, often made of paper, to make precise adjustments to the focal length, between the camera lens and sensor. In the case of a movie camera, this calibration process is laborious and time-consuming. Factors such as heat and repeated use of the shims introduce new variables, as they can change the thickness of the shim or camera components and alter the focal length between camera lens and sensor.

The time-consuming calibration process delays filming and therefore generates expense. New technology is desirable to simplify the lens calibration process.

SUMMARY

A focus calibration apparatus allows fine adjustments to be made to the focal distance between a camera lens and sensor, in particular to take into account small changes in the mechanical tolerances when changing lenses, or focal length changes due to factors such as temperature changes. The calibration apparatus has a simple control, like a focus ring, that a user can easily manipulate to simplify and speed the lens calibration process.

In one embodiment, a camera comprises a camera body with an image-receiving surface for receiving an image from a camera lens. The surface may comprise film, or an electronic sensor such as a CCD or CMOS sensor. The camera lens is mounted onto a lens mount carried by the camera body. Between the camera lens and the camera body, or built in as part of the lens mount, is a focus calibration apparatus. The focus calibration apparatus comprises two supports such as rings or discs—a lens-mount disc and a camera-mount disc—and a control such as a rotating ring.

The camera-mount disc attaches to the camera and the lens-mount disc attaches to the lens. Manipulation of the control makes fine adjustments in distance measured along an as-mounted optical path between the camera mount and the lens mount.

In one embodiment, each disc threads into the rotating ring. The discs are linked to each other with pins that maintain them in the same rotational relationship, even as a user manipulates the rotating ring, but which permit axial shortening or lengthening along the optical path. The rotating ring has two sets of opposed female threads. One set of threads mates with the camera-mount disc. The second set of threads mates with the lens-mount disc. As a user twists the rotating ring, the opposed threads cause the two discs to move longitudinally, either away or toward one another along the optical path.

The focus calibration apparatus allows controlled adjustment of the length along the optical path between the sensor and the lens of about 0.002 inches or less, in some embodiments about 0.001 inches or less, and, in some embodiments of about 0.0005 inches or less. Adjustment may be on a continuous basis, or in a stepped function.

In certain embodiments, a camera is provided including a camera body. The camera may further include an image plane adapted to receive an image from a camera lens. In some embodiments, the camera further includes a camera-mount disc attached to said camera body, having threads on its perimeter. The camera may have a rotating ring threaded onto the threads of said camera-mount disc. In certain embodiments, the camera includes a lens-mount disc having threads on its perimeter. The lens-mount disc is threaded onto said rotating ring in some embodiments.

A focus calibration system is provided in certain embodiments for mounting between a camera and a lens to permit fine focus adjustment. The system can include a camera mount configured for mounting to a camera. The system may further include a lens mount configured for mounting to a lens. In certain embodiments, a control is provided. In some embodiments, manipulation of the control may change a distance between the camera mount and the lens mount as measured along an optical path extending through the camera mount and the lens mount.

In accordance with a further aspect of the present invention, there is provided a method of calibrating focus following a lens exchange on a camera. In certain embodiments, the method comprises the steps of providing a camera having an image plane and a calibration system and a first lens mounted thereon. In some embodiments, the first lens is removed from the camera and a second lens is attached to the camera. In certain embodiments, the method includes calibrating the focus by adjusting a distance between the image plane and a second lens through a continuous range of motion without removing the second lens from the camera. In one implementation of the invention, the adjusting step comprises rotating a ring about an optical axis of the lens.

Further features and advantages of the present invention will become apparent to those of skill in the art in view of the detailed description of preferred embodiments which follows, when considered together with the attached drawings and claims.

DETAILED DESCRIPTION

The focus calibration embodiments are described herein primarily in the context of movie cameras. However, nothing limits the claims or the invention to movie cameras. The disclosure is also applicable to any camera including emulsion film and digital moving image or still image cameras—or, indeed in any optical instrument—for which it is desirable to obtain a fine-tuned focus adjustment.

Figure 1:
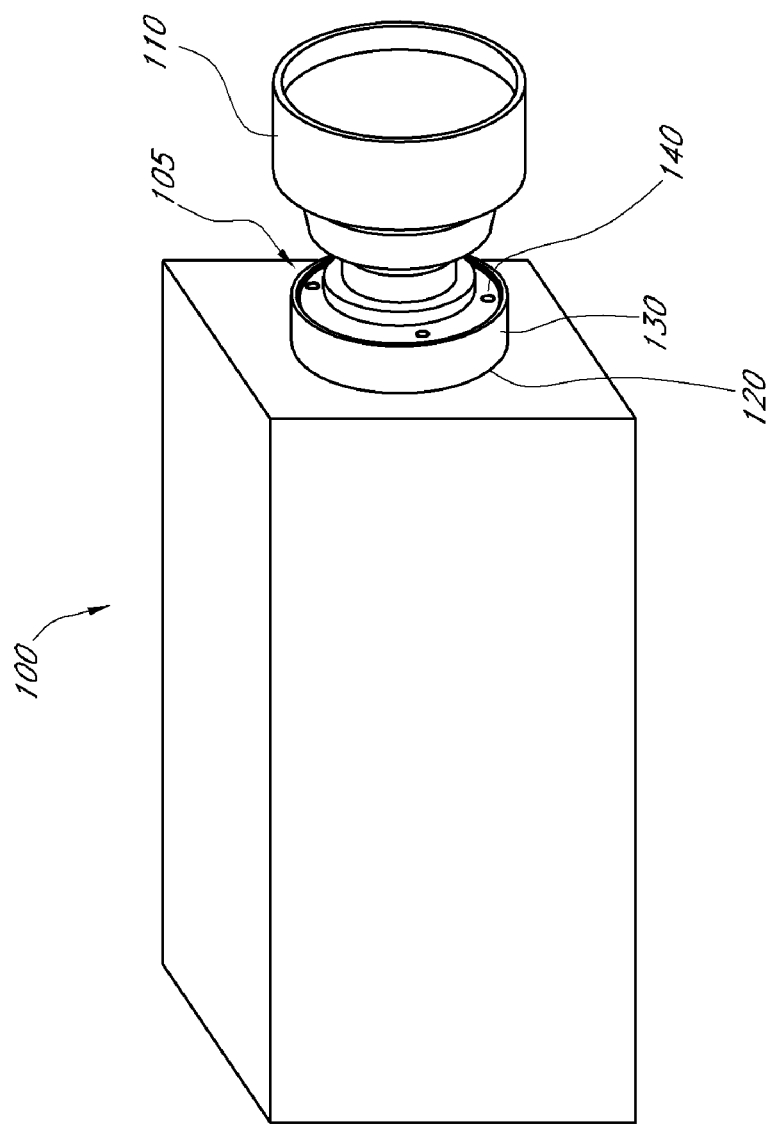
FIG. 1 depicts a movie camera with a focus calibration apparatus.

FIG. 1 depicts a simplified movie camera incorporating a focus calibration apparatus 105. A camera lens 110 connects to a camera body 100. The focus calibration apparatus 105 comprises a rotatable ring 130 and a first threaded disc 140. The focus calibration apparatus 105 additionally comprises a second threaded disc—not visible in this figure—that is positioned between the first threaded disc 140 and an image plane on the camera. The second threaded disc mounts the focus calibration apparatus 105 to the camera body 100 at a mounting point 120. The camera lens 110 is mounted onto the first threaded disc 140.

The "mountings" carried by the focus calibration apparatus 105 for mounting to the camera and to the lens may be any of a variety of conventional connections known to persons skilled in the art. The mounts may include fixed mounts, like screws, pins, rivets, welds, or solder joints. Or, the mounts may include detachable mounts, like clasps, snaps, bayonet, breach, friction, tabbed, or threaded mounts. Detachable mounts will often be suitable for the camera lens mount. However, focus calibration apparatuses of the present disclosure might also be suitable for a fixed lens, where environmental factors like thermal expansion make fine adjustments to the focal length between lens and sensor advantageous. The focus calibration apparatus may be integral with either the camera body 100 or the camera lens 110.

Figure 2:
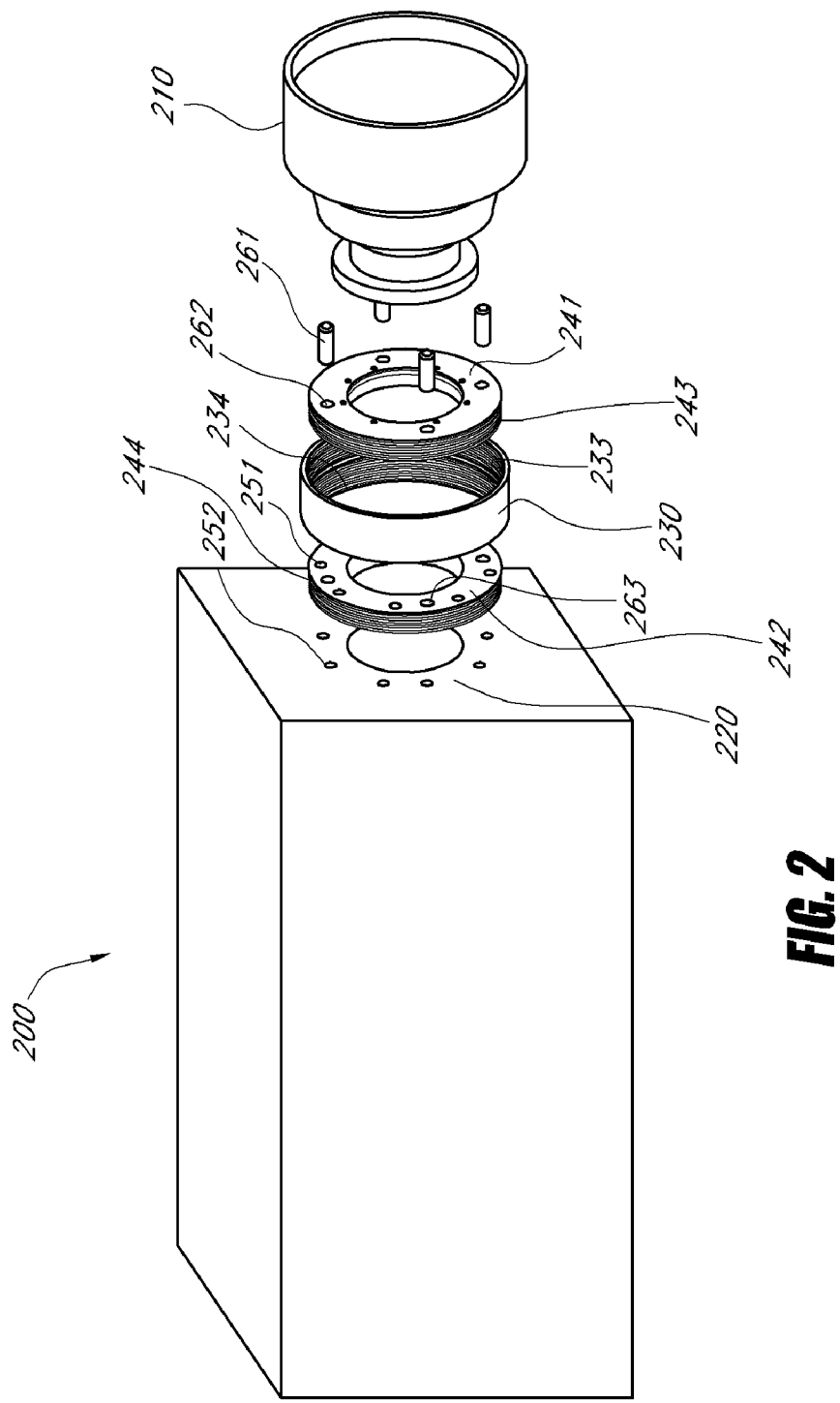
FIG. 2 depicts a movie camera with an exploded view of a focus calibration apparatus.

FIG. 2 depicts a movie camera with an exploded view of one implementation of a focus calibration apparatus. A camera body 200 connects to a camera lens 210. The focus calibration apparatus connects to a mount point 220 on the camera body 200 A camera-mount disc 242 has a plurality of pins or holes 251 that mesh with complementary mounting structures such as holes 252 on the camera such as on the camera body 200. Pins, rivets, screws, or other fasteners are all appropriate mechanisms to connect the camera-amount disc 242 to the camera body 200. Alternatively, the camera-mount disc 242 is secured onto the camera body 200 such as by welding or adhesives, or formed integral with the camera body 200. As described herein, the mounting to the "camera body" refers to mounting in a manner that fixes the camera mounting such as camera mount disc 242 with respect to the image sensor. This may be achieved by direct mounting to the camera housing, or to a mounting surface on the camera that is distinct from the housing. The camera-mount disc 242 has threads 244 on its outer perimeter that mate with a rotatable ring 230.

A rotatable ring 230 threadably engages the threads 244 of the camera-mount disc 242 with threads 234 on the interior of the ring 230. The rotatable ring 230 has a second set of internal threads 233 into which a lens-mount disc 241 is screwed. The lens-mount disc 241 has exterior threads 243 that mate with the internal threads 233 of the rotatable ring 230.

One or two or more pins 261 (e.g. four) rotationally link the lens-mount disc 241 with the camera-mount disc 242. The pins 261 are inserted through a first plurality of pin holes 262 in the lens-mount disc 241 and a second plurality of pin holes 263 in the camera-mount disc. The pins 261 maintain the lens-mount disc 241 in the same rotational orientation as the camera-mount disc 242, but are slideably engaged with at least one of the discs 241 and 242 to permit axial adjustment along the optical path. The camera lens 210 mounts to the lens-mount disc 241. Because the camera-mount disc 242 is fixedly attached to the camera, the lens-mount disc 241 and also the lens 210 are maintained in the same rotational orientation as the camera body 200.

In this embodiment, the pitch of the rotating ring's first set of internal threads 233 and second set of internal threads 234 are oriented in opposite directions. One set of threads are right-handed, and the other set of threads are left-handed. Thus, when the rotating ring 230 is turned by an operator in a first direction, the lens-mount disc 241 and camera-mount disc 242 move longitudinally away from one another, relative to the rotating ring 230, along the optical axis. The change in the focal length between lens and sensor is the sum of the longitudinal movement along the first set of internal threads 233 and the second set of internal threads 234. Thus, the precision of the adjustments that can be made in this embodiment depends, among other things, on the size of the threads as will be discussed further below.

Figure 3:
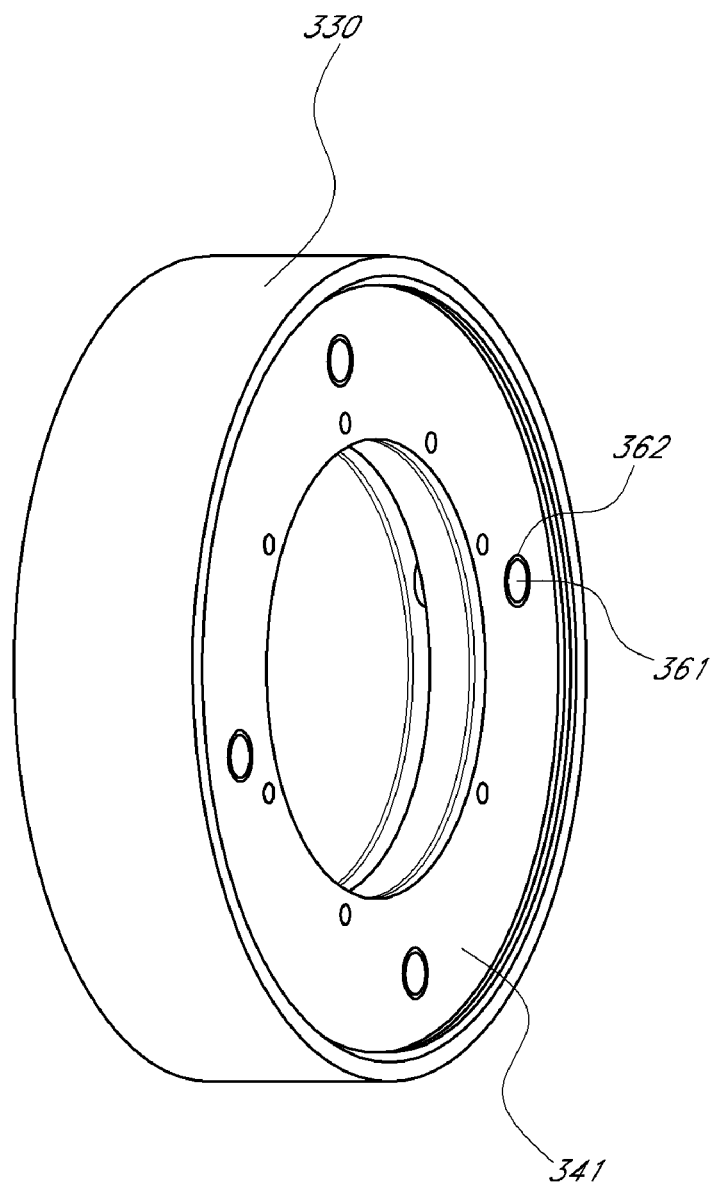
FIG. 3 depicts a focus calibration apparatus in isolation from the movie camera and lens.

FIG. 3 depicts an assembled focus calibration apparatus. A rotatable ring 330 encloses a lens-mount disc 341. The lens-mount disc 341 connects to a camera-mount disc, behind the lens-mount disc, with four pins 361. The four pins 361 are inserted into a plurality of holes 362 in the lens-mount disc 341.

The rotatable ring 330 may be provided with any of a variety of surface structures or features to facilitate gripping and rotating the ring 330 to accomplish the fine calibration described herein. For example, ridges, grooves, knurling, or other friction enhancing surface structures or textures may be utilized.

Figure 4:
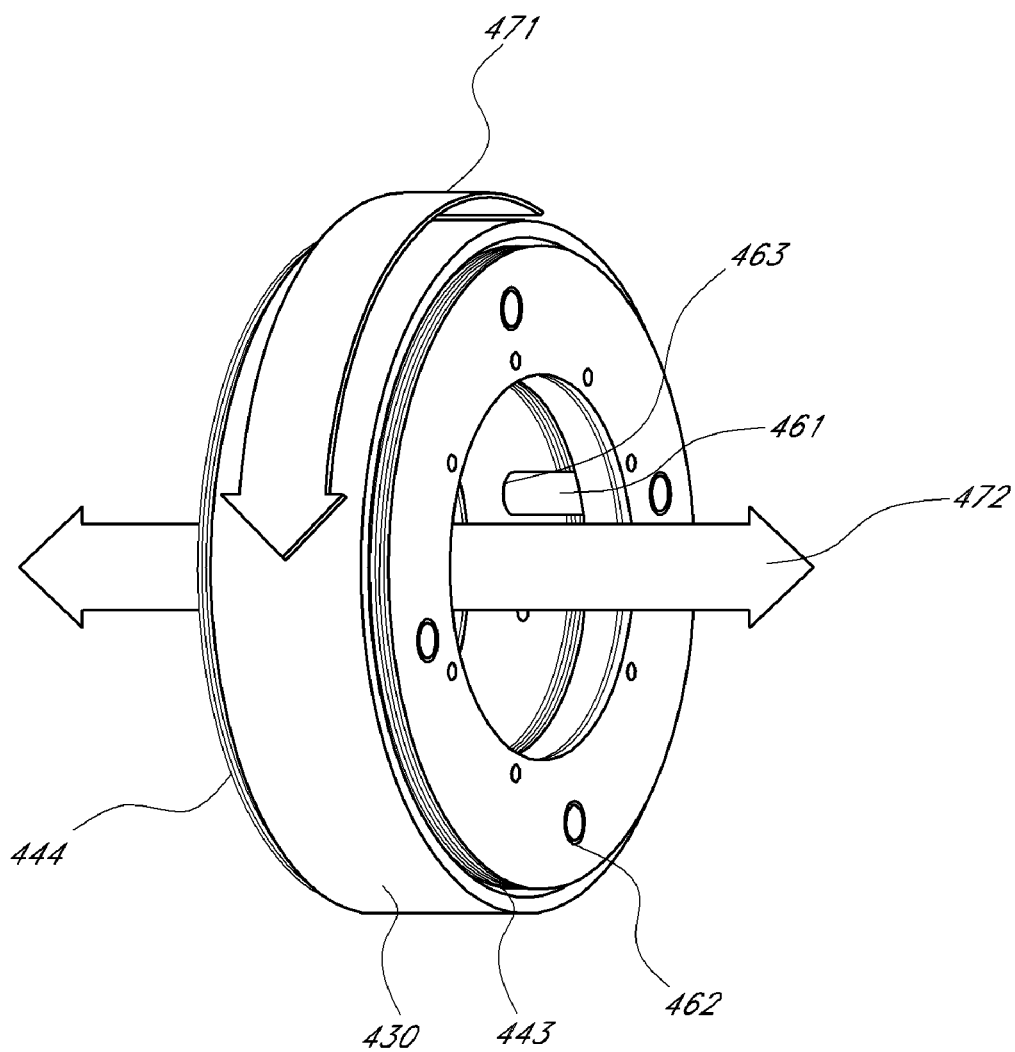
FIG. 4 depicts the operation of a focus calibration ring.

FIG. 4 depicts a focus calibration apparatus as in FIG. 3, illustrating rotational movement 471 of a focus ring 430 to make fine adjustments to the focal length between a camera lens and sensor. The focus ring 430 has two sets of internal, opposed threads. One set of internal threads mates with the threads 443 on the perimeter of a lens-mount disc 441. The other set of internal threads on the focus ring 430 mates with the threads 444 on the perimeter of a camera-mount disc 442. The lens-mount disc 441 and the camera-mount disc 442 maintain their rotational relationship to one another with four pins 461 that are placed through holes in each disc. In this figure, the pins 461 are inserted through a first set of holes 462 in the lens-mount disc 441 and a second set of holes 463 in the camera-mount disc. As the focus ring is rotated 471, the opposed threads of the ring push the two threaded discs longitudinally apart 472, or pull them together if the ring 430 is rotated in a second, opposite direction, without rotational movement of the discs themselves.

The pitch on the threads 443 of the lens-mount disc 441 and the threads 444 on the camera-mount disc 442 are generally no more than about 3 mm, often no more than about 2 mm, and, in one embodiment, no more than about 1 mm. One revolution of the focus ring 430 having a 1 mm pitch on each end produces 2 mm of longitudinal lens travel—1 mm of travel by the lens-mount disc 441 and 1 mm of travel by the camera-mount disc 442. Of course, grosser or finer pitches may be suitable, depending on the particular application.

The rotatable ring 330 may be provided with any of a variety of visual or tactile indicium of the amount of adjustment that has been accomplished. For example, a calibration scale such as a plurality of lines may be provided on the rotatable ring 330 or a non-rotatable adjacent component, with a line or marker on the other of the rotatable ring or non-rotatable structure. The calibration scale may be calibrated to allow a user to make adjustments in the axial length of the optical path either continuously or in increments of 0.001 inches, 0.0005 inches, or other distance. Tactile feedback may be provided by including a plurality of detents between the rotatable ring and a non-rotatable component so that the user may hear and/or feel as the rotatable ring 330 clicks or snaps in predetermined increments as the ring is rotated.

In general, the focus calibration apparatus will be calibrated to allow changes in the axial length along the optical path between the lens and the sensor in a controllable fashion as low as 0.002 inches, preferably as low as 0.001 inches, and, in some embodiments, as low as 0.0005 inches or less. The total adjustment range for the change in length is generally no greater than about 0.10 inches, and in many applications, the adjustment length will be no more than about 0.020 inches or 0.010 inches or less. Thus, the calibration adjustment achieved by the present invention is not intended as a substitute for conventional focus adjustment achieved by the lens.

A user calibrates focus by adjusting the focus ring and comparing the focus level to a visual pattern placed at a known distance. Alternatively, the focus calibration apparatus has indices indicated on the barrel, such that the user can determine an objectively correct focus calibration. Indices of this sort are useful, for instance, if the user has a set of lenses used on the same camera, and knows to which index the focus calibration apparatus was set the last time a lens was used.

In other embodiments, it is possible to double the resolution of the focus ring for a given thread pitch by using only one threaded disc. The simplest way of accomplishing this is to axially fix either the lens-mount disc or camera-mount disc in the focus ring while continuing to permit relative rotation. Either the lens-mount disc or camera mount disc may rotatably travel in one or a plurality of annular grooves, rather than on threads. Thus, the focus ring merely spins about the disc, with no longitudinal travel, as the user adjusts the focus ring.

Figure 5:
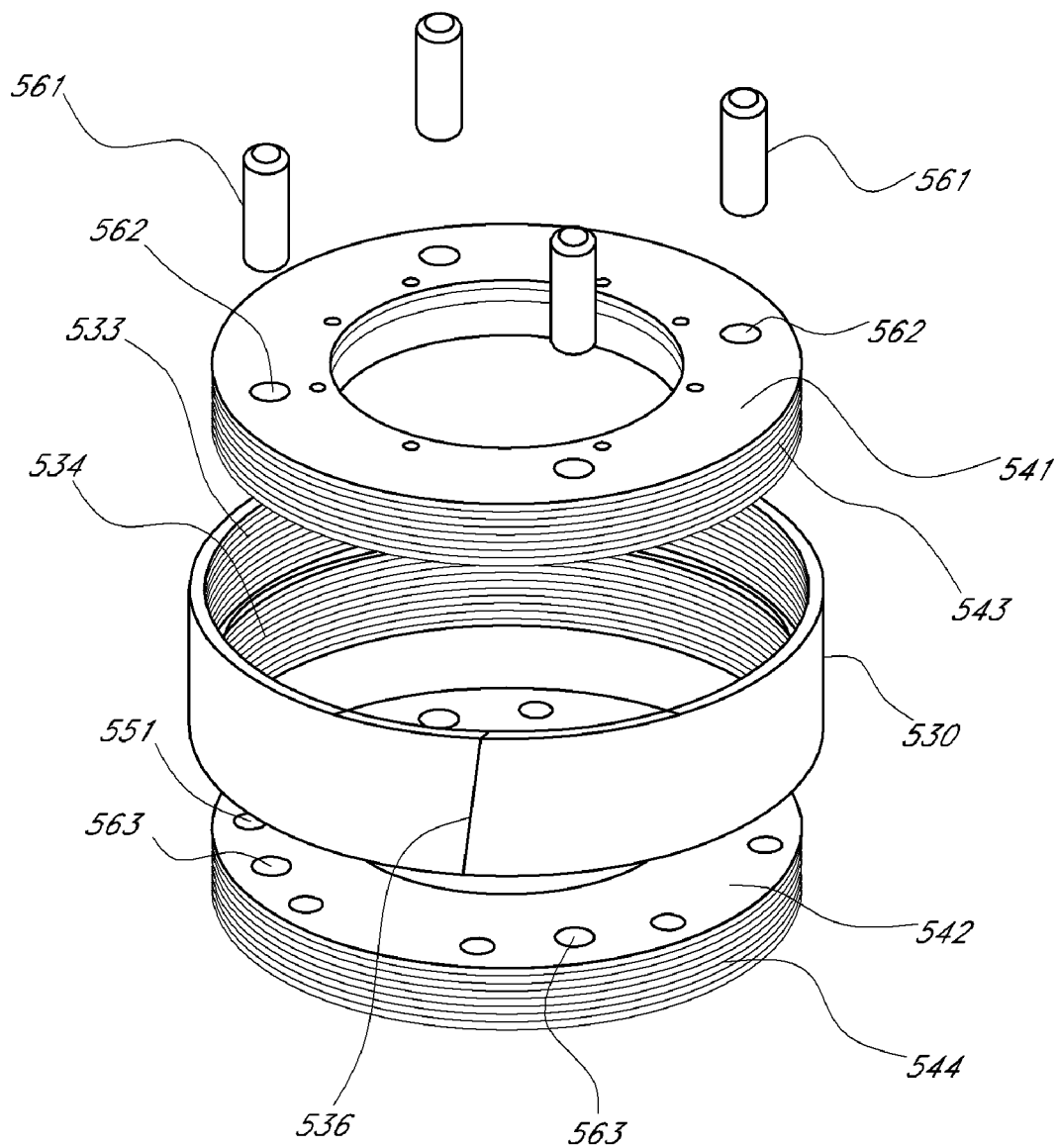
FIG. 5 depicts an exploded view of a focus calibration apparatus.

FIG. 5 depicts an exploded view of a focus calibration apparatus similar to the one shown in FIG. 4, but with twice the sensitivity for a given thread pitch. A focus ring 530 has a first set of internal threads 533 that mate with the threads 543 on the perimeter of a lens-mount disc 541, as has been discussed. The focus ring 530 has a second set of internal annular ridges and grooves 534 which are parallel to each other and mate with corresponding ridges and grooves 544 on the perimeter of a camera-mount disc 542. The lens-mount disc 541 and the camera-mount disc 542 are connected with four pins 561. The pins 561 are inserted through a first set of holes 562 in the lens-mount disc 541 and a second, parallel set of holes 563 in the camera-mount disc 542. The pins 561 maintain the lens-mount disc 541 and the camera-mount disc 542 in the same rotational relationship even as the user rotates the focus ring 530. Because the camera-mount disc 542 is fixedly attached to the camera at a plurality of attachment points 551, the lens-mount disc 541 will maintain its relative rotational orientation to the camera, even as rotation of the ring 530 causes the disc to travel longitudinally.

Since the internal annular ridges and grooves 534 on the focus ring 530 are parallel with each other, the focus calibration apparatus of this embodiment cannot be assembled by threading the focus calibration ring 530 over the camera-mount disc 542. Thus, the ring 530 is provided with one or two or more part lines 536 at which the ring is separable into two or more components. In this manner, the ring may be partially or completely opened and mounted over the annular ridges and grooves 544 and thereafter reclosed into an annular structure and bonded such as by welding or other technique at part line 536.

Figure 6A:
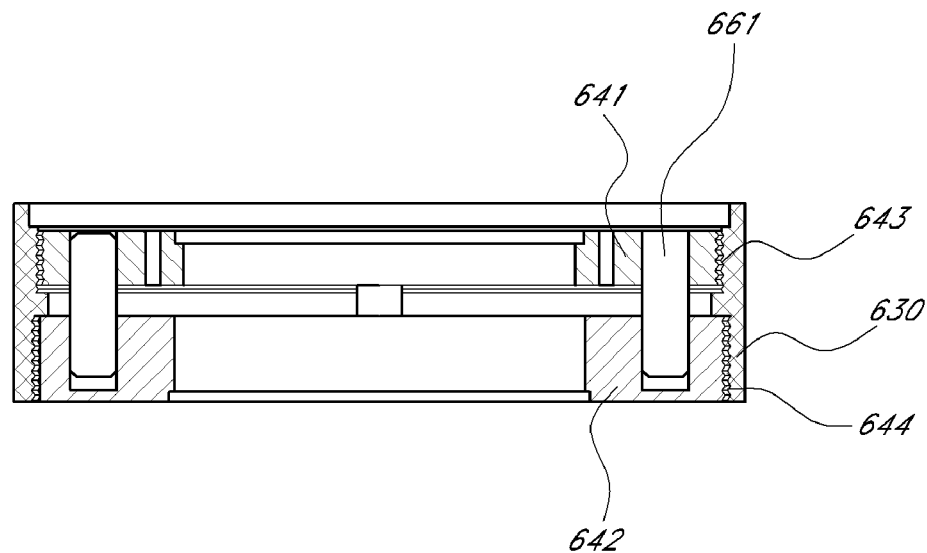
FIGS. 6A and 6B depict cross sections of a focus calibration apparatus.
Figure 6B:
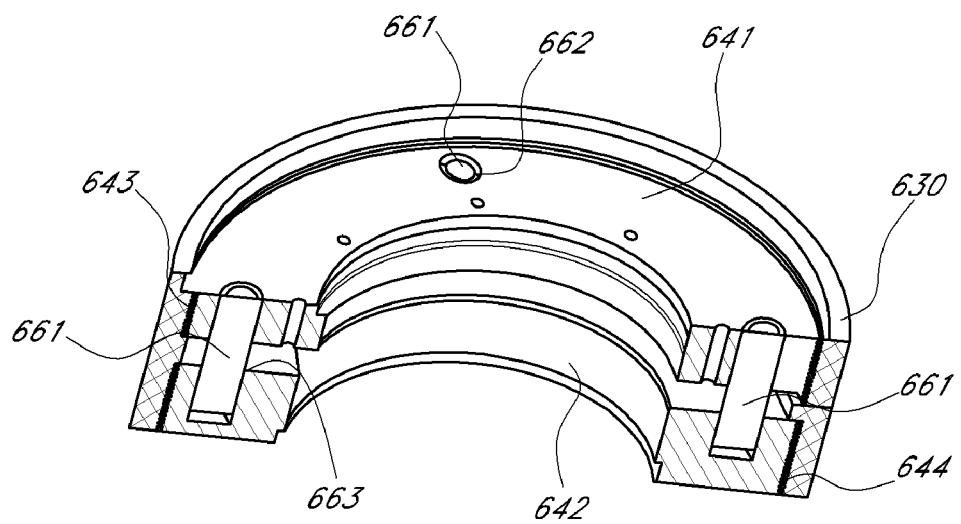

FIGS. 6A and 6B depict two cross-sectional views of a focus calibration apparatus such as that illustrated in FIG. 3. A focus ring 630 has a first set of internal threads 643 that mate with the threads on the perimeter of a lens-mount disc 641. The focus ring 630 also has a second set of internal threads 644 that mate with the threads on a camera-mount disc 642. The lens-mount disc 641 and the camera-mount disc 642 are maintained in the same rotational relationship with a plurality of axially slidable pins 661. The pins 661 fit through holes 662 in the lens-mount disc 641 and another set of holes 663 in the camera-mount disc 642.

Figure 7:
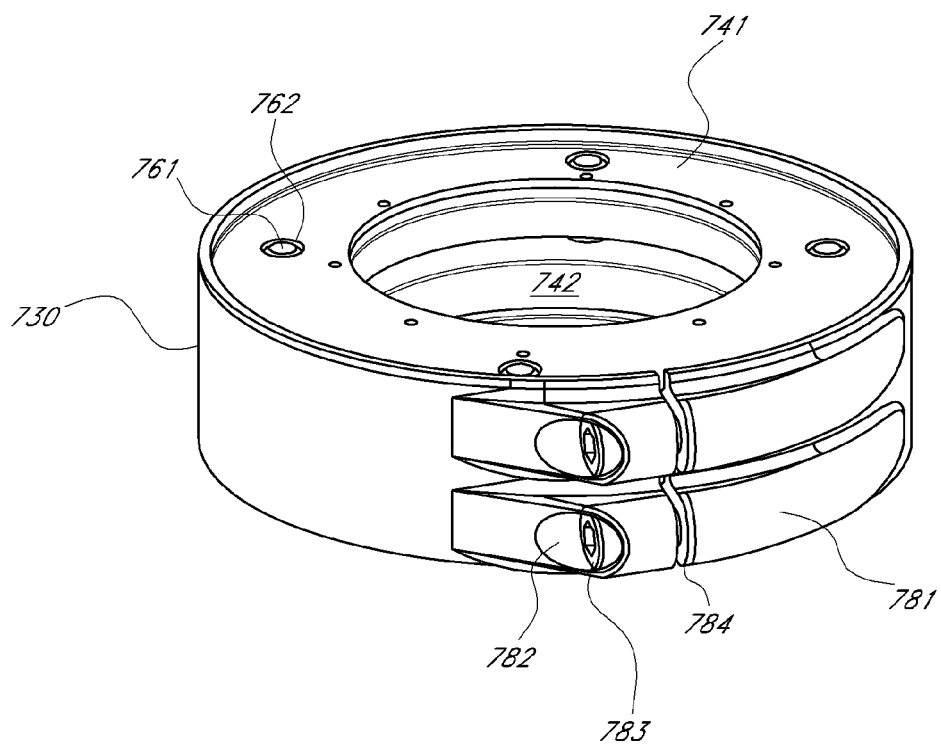
FIG. 7 depicts another embodiment of a focus calibration apparatus, with a clamping mechanism.

FIG. 7 depicts an embodiment of a focus calibration apparatus that includes a lock such as a clamp for retaining a desired adjustment. A focus ring 730 has two sets of internal threads—each opposed to the other—that mate with the threads on a lens-mount disc 741 and the threads on a camera-mount disc 742. The lens-mount disc 741 and the camera-mount disc 742 are maintained in the same rotational relationship with four pins 761. The pins 761 are inserted through a set of holes 762 in the lens-mount disc 641 and another set of holes in the camera-mount disc 742 that are not visible in this figure.

In addition to these features, which are similar to those present in other embodiments described herein, the focus ring 730 has a clamping mechanism. The focus ring 730 in this embodiment is not complete circle, but has a gap 784. On one side of the gap are one or two or more receivers 782 that accept corresponding screws 783. On the other side of the gap are corresponding sockets 781 into which the screws 783 are screwed to tighten the gap 784 in the focus ring 730. As the screws 783 are tightened, the ring 730 tightens around the lens-mount disc 741 and the camera-mount disc 742. This tightening action prevents the ring 730 from being inadvertently turned by the user or anything else, causing unintended longitudinal movement of the lens-mount disc 741 and the camera-mount disc 742.

Other examples of locking features, besides the clamp depicted in FIG. 7, include clasps, locking pins, or switches. Indeed, any of a variety of mechanisms that lock the focus calibration ring in place, such that it cannot be inadvertently adjusted, may be utilized. In other embodiments, no locking feature is built onto the ring, but the ring turning mechanism has high friction, or is detented, such that the ring is unlikely to move without an intentional application of force.

Various embodiments have been described above. Although described with reference to these specific embodiments, the descriptions are intended to be illustrative and are not intended to be limiting. Various modifications and applications may occur to those skilled in the art.

What is claimed is:

1. A camera comprising:
    a camera body;
    an image plane adapted to receive an image from a camera lens;
    a camera-mount disc attached to said camera body, having threads on its perimeter;
    a rotating ring threaded onto the threads of said camera-mount disc;
    a lens-mount disc having threads on its perimeter, wherein said lens-mount disc is threaded onto said rotating ring; and
    one or more attachments connecting said lens-mount disc to said camera-mount disc, said attachments maintaining the lens-mount disc and the camera-mount disc in substantially constant rotational relationship.

2. The camera of claim 1, wherein said attachments are pins.

3. The camera of claim 1, further comprising a locking apparatus that, when engaged, maintains the rotating ring in a substantially constant rotational position.

4. The camera of claim 3, wherein said locking apparatus is a clamp.

5. The camera of claim 1, wherein one rotation of said rotating ring results in longitudinal travel of less than four millimeters between said lens-mount disc and said camera-mount disc.

6. The camera of claim 1, wherein the image plane comprises a digital sensor.

7. A focus calibration system for mounting between a camera and a lens to permit fine focus adjustment, comprising:
 a camera mount, configured for mounting to a camera;
 a lens mount, configured for mounting to a lens; and
 a control, wherein manipulation of the control changes a distance between the camera mount and the lens mount as measured along an optical path extending through the camera mount and the lens mount; and
 a link between the camera mount and the lens mount which permits the change distance but prevents rotation of the lens mount with respect to the camera mount about the optical axis.

8. The focus calibration system of claim 7, wherein the link comprises at least one pin extending in parallel to the optical path.

9. The focus calibration system of claim 7, wherein the control comprises a ring which is rotatable about the optical axis.

10. The focus calibration system of claim 9, wherein the ring comprises a first female thread for engaging the camera mount.

11. The focus calibration system of claim 10, wherein the ring comprises a second female thread for engaging the lens mount.

12. The focus calibration system of claim 10, wherein the first female thread has a pitch of no more than about 3 mm.

13. The focus calibration system of claim 9, wherein one complete revolution of the ring about the optical axis changes the distance by no more than about 5 mm.

14. The focus calibration system of claim 9, wherein one complete revolution of the ring about the optical axis changes the distance by no more than about 2 mm.

15. The focus calibration system of claim 9, wherein one complete revolution of the ring about the optical axis changes the distance by no more than about 1 mm.

16. A camera comprising:
 a camera body;
 an image plane adapted to receive an image from a camera lens;
 a camera-mount disc attached to said camera body, having threads on its perimeter;
 a rotating ring threaded onto the threads of said camera-mount disc;
 a lens-mount disc having threads on its perimeter, wherein said lens-mount disc is threaded onto said rotating ring; and
 a locking apparatus that, when engaged, maintains the rotating ring in a substantially constant rotational position.

17. The camera of claim 16, wherein said locking apparatus is a clamp.

18. The camera of claim 16, wherein one rotation of said rotating ring results in longitudinal travel of less than four millimeters between said lens-mount disc and said camera-mount disc.

19. The camera of claim 16, wherein the image plane comprises a digital sensor.

20. The camera of claim 16, further comprising one or more attachments connecting said lens-mount disc to said camera-mount disc, said attachments maintaining the lens-mount disc and the camera-mount disc in substantially constant rotational relationship, wherein said attachments are pins.

* * * * *

UNITED STATES PATENT AND TRADEMARK OFFICE
CERTIFICATE OF CORRECTION

PATENT NO.       : 8,019,216 B2
APPLICATION NO.  : 12/625451
DATED            : September 13, 2011
INVENTOR(S)      : James H. Jannard It is certified that error appears in the above-identified patent and that said Letters Patent is hereby corrected as shown below:

At Column 7, Line 26 (Approx.), in Claim 7, change "change" to --change in--.

Signed and Sealed this
Nineteenth Day of June, 2012

David J. Kappos
*Director of the United States Patent and Trademark Office*